July 15, 1958  M. J. LUSH  2,843,825
ELECTRODYNAMOMETER
Filed Oct. 25, 1955  3 Sheets-Sheet 1
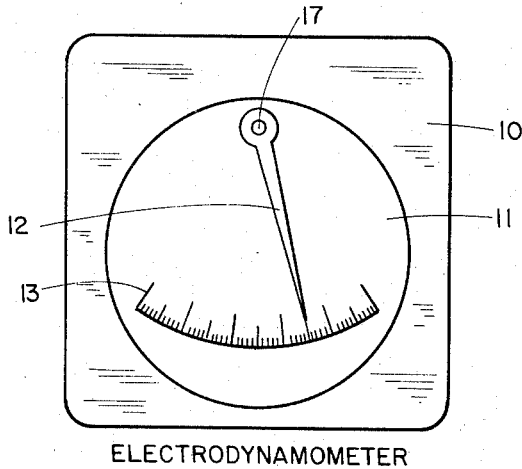
ELECTRODYNAMOMETER
FIG. I
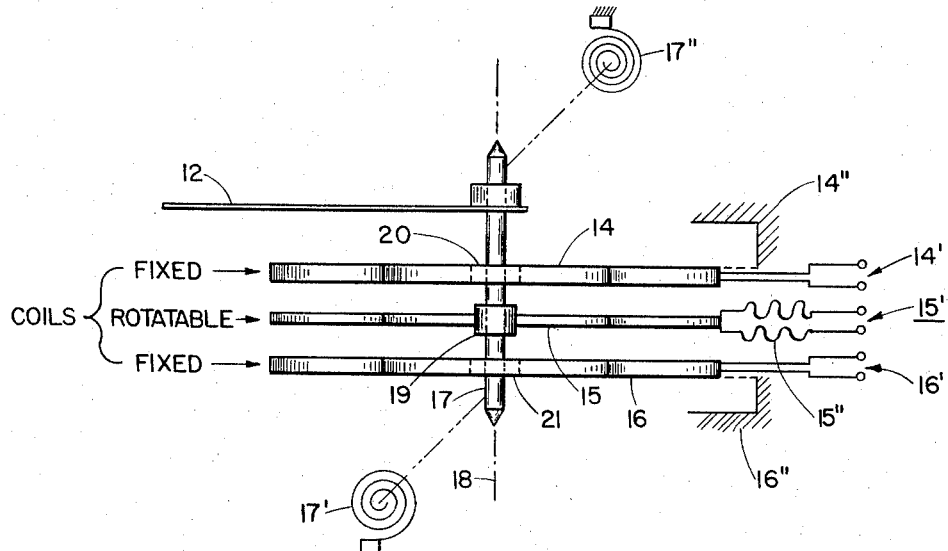
FIG. II
INVENTOR
MORLEY J. LUSH
BY
Lawrence H. Paxton
AGENT July 15, 1958  M. J. LUSH  2,843,825
ELECTRODYNAMOMETER
Filed Oct. 25, 1955  3 Sheets-Sheet 2
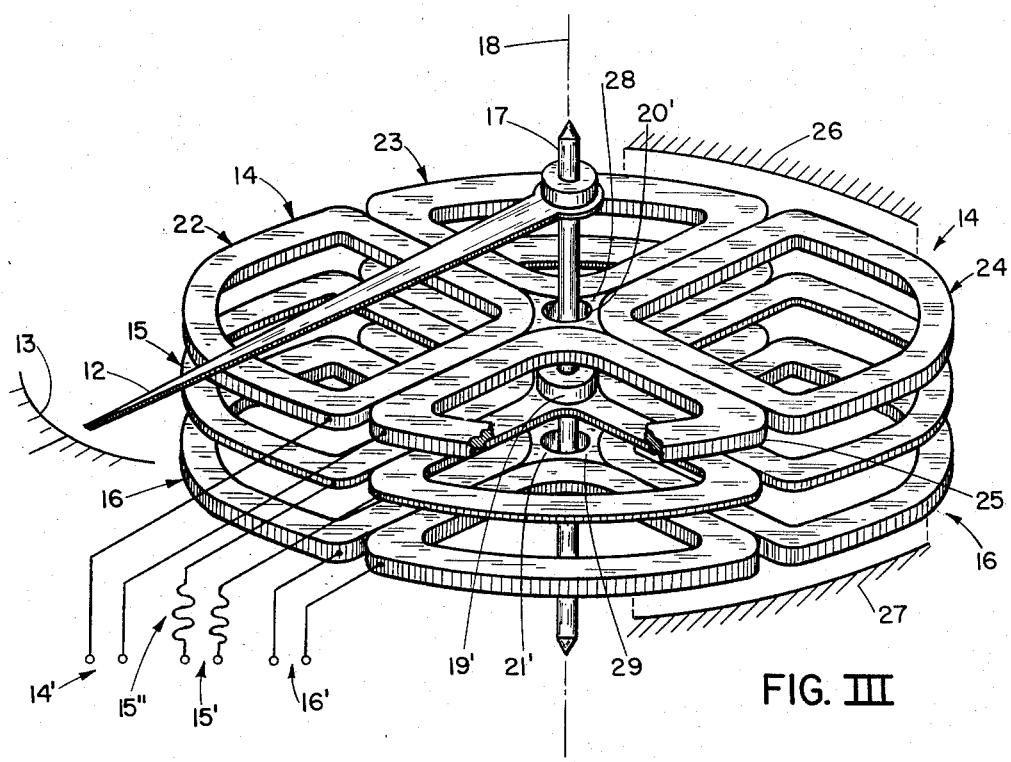
FIG. III
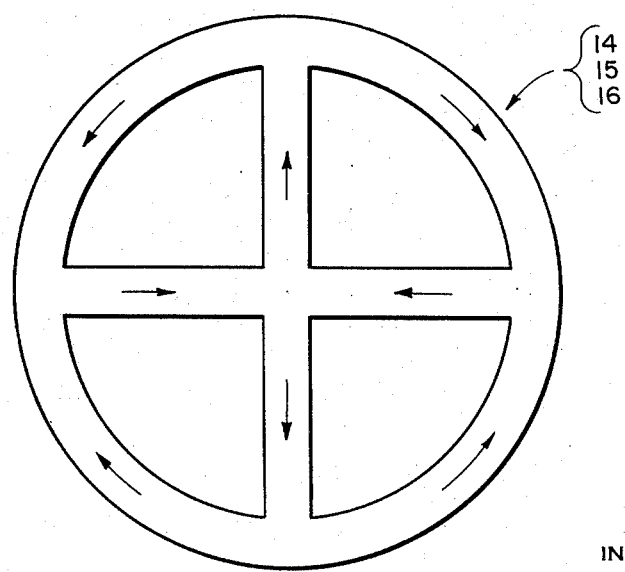
FIG. IV
INVENTOR
MORLEY J. LUSH
BY
Lawrence H. Patton
AGENT July 15, 1958  M. J. LUSH  2,843,825
ELECTRODYNAMOMETER
Filed Oct. 25, 1955  3 Sheets-Sheet 3
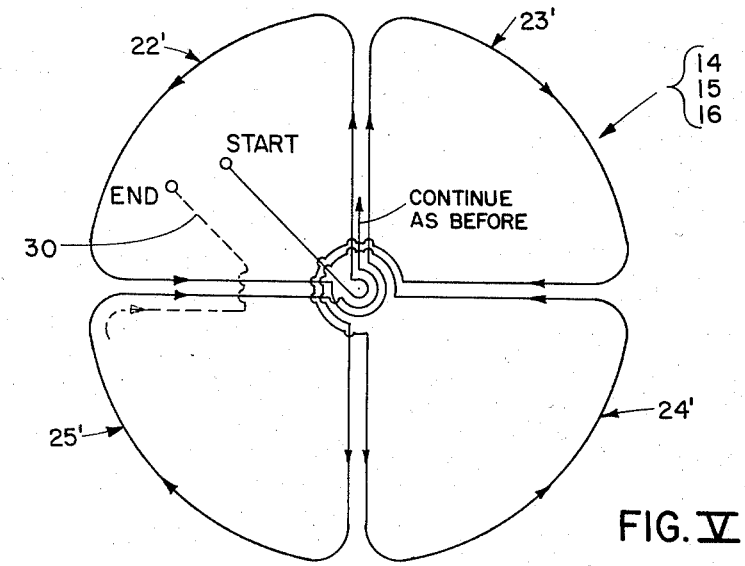
FIG. V
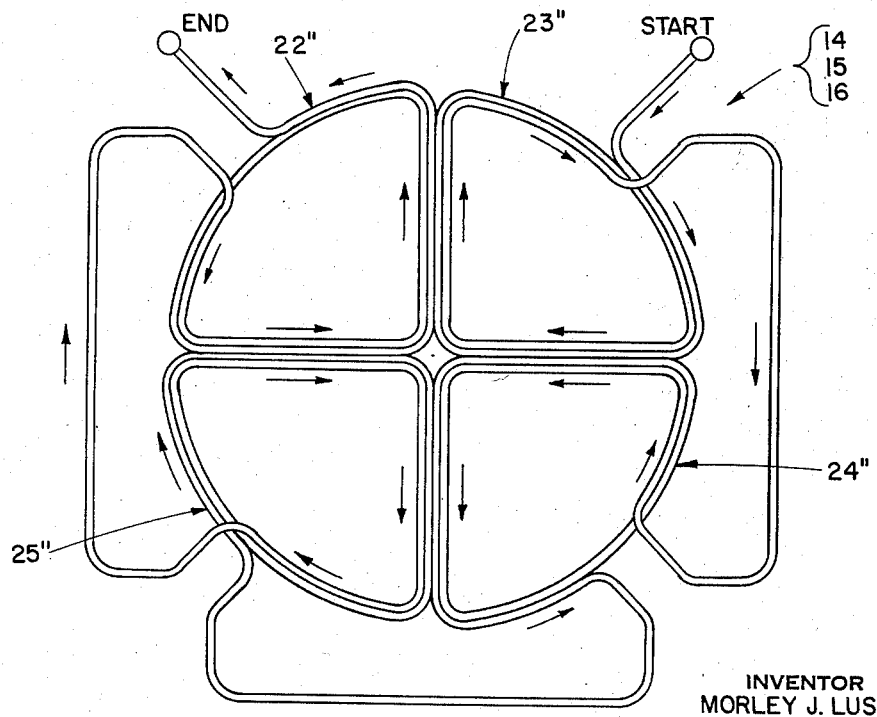
FIG. VI
INVENTOR
MORLEY J. LUSH
BY
Lawrence H. Poeton
AGENT

United States Patent Office 2,843,825
Patented July 15, 1958

2,843,825

ELECTRODYNAMOMETER

Morley J. Lush, Concord, Mass.

Application October 25, 1955, Serial No. 542,709

1 Claim. (Cl. 324—144)

This invention relates to electrical meters of the mutual inductance type, and has particular reference to coil arrangement and structure in such meters.

The simplest form of electrodynamometer consists of two coils of wire arranged so that there is a mutual inductance between them. If one coil is fixed, the torque tending to rotate the other coil is given by the formula:

$$T = I_1 I_2 \frac{\partial M}{\partial \theta} \quad (a)$$

where T is the torque, $I_1$ is the current in the rotary coil, $I_2$ is the current in the fixed coil, M is the mutual inductance between the coils, and $\theta$ is the angle of rotation of the coil.

When this instrument is used as an ammeter or milliammeter, the coils are commonly connected in series so that the same current flows through both of them, and the torque is given by the formula:

$$T = I^2 \frac{\partial M}{\partial \theta} \quad (b)$$

Since the torque is proportional to the square of the current, root-mean square readings are provided on alternating currents. The instrument total inductance is given by:

$$L = L_1 + L_2 + 2M \quad (c)$$

where $L_1$ is the self inductance of the rotary coil, and $L_2$ is the self inductance of the fixed coil. From the standpoint of minimum total inductance, a theoretically perfect set of coils would have a maximum value of M at maximum deflection of the rotary coil, with perfectly coupled magnetic fields. Perfect coupling, often called "unity coupling," gives a value of $M_{MAX}$ equal to $\sqrt{L_1 L_2}$. No higher value of M is theoretically possible, and much lower values are usually found. In addition, if the coils are proportional so that $L_1 = L_2$, the total inductance at this full scale point will be:

$$L_{MAX} = 4M_{MAX} \quad (d)$$

The torque Equation b sets a lower limit on the value of $M_{MAX}$ necessary to the operation of the instrument, once the values of current, torque, and deflection angle have been chosen. Therefore, Equation d shows the minimum value of instrument total inductance which could be attained by a theoretically perfect set of coils. Practical instruments always have a higher inductance than this, because they are far less than perfectly coupled at full scale, and because they rarely have equal self-inductances in the fixed and rotary coils. Because of the high inductance, there is excessive voltage drop across the instrument when it is used at high frequencies.

Electrodynamometer voltmeters are simply milliammeters with a series resistance added and with a scale calibrated in terms of voltage instead of current. In such a case, it is even more important that the total inductance of the coils be at a minimum if the voltmeter is to be used at more than one frequency. Any appreciable inductance causes the instrument impedance to be higher at high frequencies than at low frequencies, and so the reading will vary with the frequency.

In electrodynamometer wattmeters, the two coils are used in separate circuits with the torque given by Equation a. Here again, it is always desired that the instrument inductances be as low as possible. A very similar analysis to that given above will again point out the desirability of obtaining a high percentage coupling between the coils in order to obtain the required value of $$\frac{\partial M}{\partial \theta}$$

and still keep $L_1$ and $L_2$ as low as possible.

In the conventional electrodynamometer instruments, large outer coils are used to establish a fairly uniform field in the vicinity of a small central coil. The small coil is arranged with pivots or other means allowing rotation. Mutual inductance occurs between the large and the small coils and varies approximately as the cosine of the angle of rotation of the small coil, being maximum positive or maximum negative when the axes of the coils are in line, and zero when the axes are at right angles to each other. If the zero mutual inductance point is chosen as mid-scale on the instrument, and a value of $M_{MAX}$ is obtained at full-scale, the value at the other end of the scale will be $-M_{MAX}$, and the total change in mutual inductance from one end of the scale to the other will be $\pm 2 M_{MAX}$, a desirable feature. However, maximum coupling between the coils occurs at a deflection of 90 degrees away from the zero mutual inductance point, which would give a total deflection of 180 degrees from one end of the scale to the other. Practical instruments cannot use this full length of scale because of the cosine variation in mutual inductance with angle, which causes the sensitivity to drop at either end of the scale. It is customary to limit the deflection to about 90 degrees total, resulting in a considerable decrease in the value of coupling obtained at full scale.

In the prior art conventional instrument, in order that the small central coil may turn freely inside the fixed outer coils, it is necessary to make the outer coils much larger in size than the central coil. It is impossible to get a high value of coupling between the coils with this prior art arrangement, because so many of the magnetic lines developed by the current in the fixed coil pass completely outside the small coil and make no contribution to the interlinkage between coils. Actual measurement of a number of conventional instruments shows that the maximum value of coupling between the coils at full scale deflection is limited to about 20 percent of theoretical perfect coupling. This low value naturally results in much higher instrument inductances than those predicted on the basis of perfect coupling.

A further disadvantage of the conventional coil arrangement is that it is extremely sensitive to externally applied fields. The weak magnetic field of the earth is enough to cause undesirable deflections if direct current is flowing in the moving coil, and alternating current fields of the same order of magnitude can cause serious errors when the alternating current is being measured. For this reason, it is customary to surround the coils with heavy and expensive magnetic shielding. This shielding can cause annoying difficulties in the design because of the possibility of erorrs due to eddy currents flowing in the shield material.

The present invention overcomes such prior art difficulties by providing a special arrangement and structure of electrodynamometer coils as a means of obtaining essentially maximum mutual inductance, improved range with respect to coil rotation, and a device requiring a minimum of shielding.

It is therefore, an object of this invention to provide a new and improved electrodynamometer.

Other objects and advantages of this invention will be in part pointed out hereinafter, and in the accompanying drawings, wherein:

Figure I is a face view of an electrodynamometer which may embody this invention:

Figure II is a schematic showing, in elevation arrangement, of a coil arrangement according to this invention:

Figure III is a perspective showing of a set of electrodynamometer coils embodying this invention:

Figure IV is a coil structure outline, in plan arrangement, showing electrical current flow direction in the various parts of the coil structure according to this invention:

Figure V is an illustration of one form of coil winding according to this invention; and Figure VI is an illustration of another form of coil winding according to this invention.

As a device for containing an embodiment of this invention, Figure I shows an electrodynamometer case 10, with an indicating face 11. A pointer 12 is provided for movement across the indicating face 11 with respect to an indicating scale 13 on the face 11.

In Figure II, three coil assemblies 14, 15, and 16 are shown. These assemblies are generally in the form of equal diameter flat discs, and are arranged in parallel. The upper and lower discs 14 and 16 are fixed, as indicated at 14″ and 16″, and the middle disc 15 is rotatable on a pivot shaft 17 which lies along the common center line 18 of the three assemblies. Conventional coil spring rotation bias units 17′ and 17″ are provided on the shaft 17. The middle disc is secured to the shaft 17 at 19 and for rotation therewith. The upper and lower discs 14 and 16 have central openings 20 and 21 respectively, through which the shaft 17 extends without engaging the discs 14 and 16. The fixed coil discs 14 and 16 are relatively thick, with many winding turns, and a movable coil 15 is relatively thin. The three coil discs are mounted close to each other, and the coil winding ends are indicated at 14′, 15′ and 16′. These winding ends may be connected in any desired conventional electrodynamometer manner. The winding ends 15′ of the movable coil 15 are shown at 15″ as being flexible and extensible in order to allow rotation of the coil 15.

Figure III illustrates a coil structure and arrangement according to Figure II and embodying this invention. The three coil assemblies 14, 15 and 16 are essentially identical in structure except that coil assembly 15 is thinner, with fewer windings, since it is the movable coil of the electrodynamometer.

Coil assembly 14 is taken as illustrative of the structure and winding of each of the coil assemblies. The assembly 14 is in the form of a flat circular disc, and is made up of four quadrantal pie-slice formations 22, 23, 24, and 25, joined to each other by suitable cementing means along their mutually abutting radial edges. Assemblies 14 and 16 are supported and held against movement by ground arrangements 26 and 27 respectively. Also, the coil assemblies 14 and 16 are provided with center support pieces 28 and 29 respectively, having central openings 20′ and 21′ therethrough through which the rotatable shaft 17 freely extends. The movable coil assembly 15 is secured to the shaft 17 through the boss 19′ for movement of rotation therewith.

The illustrative current flow outline which is Figure IV is indicative of the current flow in each of the coil assemblies 14, 15, and 16. These current flow directions are provided by a special winding provided by this invention. The pattern of one such winding is shown in Figure V, and the pattern of another such winding is shown in Figure VI. It is to be understood that these figures are merely winding direction illustrations, and that the actual coils will have many more winding turns, depending on the particular characteristics desired in a particular design of an electrodynamometer embodying this invention. Figure VI is shown with extra heavy, double line indication of a single wire, as a means of emphasizing the direction of the windings and the relations of the Figure III pie slices 22, 23, 24, and 25 to each other. Figure V shows the pie slice coil forms as 22′, 23′, 24′, and 25′; and Figure VI shows them as 22″, 23″, 24″, and 25″. In any case the pie slice coil forms may be wound singly and later joined and electrically connected, or they may be wound as continuous coils, as indicated in Figures V and VI.

The Figure III coil assemblies are intended to comprise coil windings according to Figure V.

In Figure V, the winding start goes to the center of the assembly. The winding then proceeds radially outward, north; then counterclockwise; then radially inward, east, to form quadrant pie slice 22′. The winding thereafter proceeds radially outward, north again; then clockwise; then radially inward, west, to form quadrant pie slice 23′; then radially outward, south; then counterclockwise; then radially inward, west, to form quadrant pie slice 24′; then radially outward, south; then clockwise, then radially inward, east, to form quadrant pie slice 25′. The winding thereafter is duplicated for as many turns as desired, and is finally ended from the final leg of the quadrant pie slice 25′ as indicated by the dash line 30.

The Figure VI winding arrangement is a continuous form of individual quadrant windings. All the desired turns are wound on one quadrant, then the wire is jumped to the next quadrant for all the desired turns there, and so on. In such an arrangement the quadrants are wound clockwise and counterclockwise in alternation to provide the current flow pattern of Figure IV.

With the directions of current flow given in Figure IV, the assembly of Figure III has characteristics which make it very suitable for use in electrodynamometer type electrical meters. It has four major advantages over conventional arrangements, as follows:

(1) *90 Degree deflection*

When the rotary coil is lined up with the fixed coils, and in the position where the rotary coil currents are all in the same directions as the corresponding currents in the fixed coils, the mutual inductance M will be maximum. If it is rotated only 90 degrees from this position, all corresponding currents in the two sets of coils will be in opposite directions, and the mutual inductance will reach its maximum negative value. Thus, this set of coils will go from $-M_{MAX}$ to $+M_{MAX}$ in only 90 degrees of rotation, and they will be at the maximum coupling possible at each end of this arc of rotation. It is inherently a 90 degree system, instead of the conventional 180 degree system with artificial limitations. A manufacturer already making conventional meters with 90 degree scale length can change over to the new coil system easily, keeping the mechanical construction of the scale plate, panel, cabinet, damping vanes, etc. the same as before. The external appearance need not be changed at all.

(2) *Greater coupling between coils*

Since the moving coil rotates in its own plane, and requires only a small gap between the outer fixed coils, the windings can be very close together, and very effectively coupling the magnetic lines of the coils. Also, almost the entire 90 degrees of deflection can be used, avoiding the loss of coupling experienced by the usual device when its scale length is limited to 90 degrees out of a possible 180 degrees, leaving the coils only partly coupled when the pointer is at full-scale. Experimental models of meters according to this invention have been found to reach as high as 70 percent of the theoretically perfect coupling between coils, compared to the 20 percent which is normal for prior art. Under the present invention much lower total inductance values are possible in milliammeters, voltmeters, and wattmeters, while still maintaining the value of $$\frac{\partial M}{\partial \theta}$$

required for deflection of the instrument.

(3) *Linear scales*

Instead of varying as the cosine of the deflection angle, as the past, the value of $$\frac{\partial M}{\partial \theta}$$

in a device according to this invention is practically constant at all points on the scale except near the very ends. This results in a more even spacing of the divisions on the scale of the instrument, particularly in wattmeters, which have to be provided with distorted scales in conventional devices. The improvement of this invention is substantially evident in voltmeters and milliammeters, even though the deflection varies as the current squared on these instruments.

(4) *Astatic system*

For two reasons, this new arrangement of coils of this invention is very insensitive to externally applied magnetic fields. The fact that the rotary coil rotates only by translation in its own plane perpendicular to the line of the pivot shows that it will not experience any force tending to rotate it if the applied field is uniform. Examination of the directions of current flow in the accompanying drawings shows that the magnetic field of each quadrant section is equal and opposite to that of the adjacent quadrants, and the net reaction to a uniform externally applied field adds up to zero. Similarly, the voltages induced in either fixed or rotary coils by an externally applied field essentially add up to zero. The practical result of this is that electrodynamometer instruments can be constructed according to this invention so as to require much less magnetic shielding than is required for conventional instruments of this type, and for many applications will be able to operate without any shielding at all. This eliminates trouble due to eddy currents flowing in the shield materials, a common source of errors at high frequencies.

This invention accordingly provides a new and improved electrodynamometer.

As many embodiments may be made of the above invention, and as changes may be made in the embodiments set forth above without departing from the scope of the invention, it is to be understood that all matter hereinbefore set forth or shown in the accompanying drawings is to be interpreted as illustrative only and not in a limiting sense.

I claim:

An electrodynamometer wattmeter system wherein a minimum impedance is provided to adapt said wattmeter to use at high frequencies, by means of the use of low inductance coils, such use being made possible by close coupling provided by the use of ninety degree coils in a not more than ninety degree movement operating range, and wherein the range of rotation of said wattmeter from maximum mutual coupling to minimum coupling is no greater than forty-five degrees, said wattmeter system comprising, in combination, a pair of fixed flat plate four coil units and a movable flat plate four coil unit therebetween, said coil units all being in closely adjacent superimposed alignment with each other, each of said coil units formed as a circular, electrically balanced assembly comprising four ninety degree pie-slice segments, and each of said coil units having a single continuous winding starting at the center of the circle, and on a map reading basis, extending radially north, then arcuately west and south, then radially east to the circle center, then radially north, then arcuately east and south, then radially west to the circle center, then radially south, then arcuately east and north, then radially west to the circle center, then radially south, then arcuately west and north, and finally radially east to the circle center, this whole path being thereafter repeated a number of times, with adjacent ones of said pie-slice coil segments thus in lateral edge abutment along radial legs of said circles, and said adjacent coils thus oppositely wound in such manner as to provide current flow in a single direction in each radial leg and to provide four such radial legs each as a combination of two radial legs formed by abutting coils, said combination radial legs each also providing for all current flow therein in a single radial direction, said combination radial legs together forming a pair of diameter legs, at right angles to each other, and, with respect to each of said diameter legs, said coil winding and arrangement providing for current flow in opposite directions in the two radial legs which form any one of said diameter legs.

References Cited in the file of this patent

UNITED STATES PATENTS

| | | |
|---|---|---|
| 517,163 | Kennelly | Mar. 27, 1894 |
| 560,379 | Thomson | May 19, 1896 |
| 800,873 | Northrup | Oct. 3, 1905 |